Dec. 17, 1940.   E. R. HAMILTON   2,225,448
PRESSURE COOKER
Filed Jan. 31, 1938   3 Sheets-Sheet 1

INVENTOR
EVERETT R. HAMILTON
BY
ATTORNEYS

Dec. 17, 1940.  E. R. HAMILTON  2,225,448
PRESSURE COOKER
Filed Jan. 31, 1938  3 Sheets-Sheet 2

INVENTOR
EVERETT R. HAMILTON
BY Paul, Paul & Moore
ATTORNEYS

Dec. 17, 1940.    E. R. HAMILTON    2,225,448
PRESSURE COOKER
Filed Jan. 31, 1938    3 Sheets-Sheet 3

INVENTOR
EVERETT R. HAMILTON
BY Paul, Paul Moore
ATTORNEYS

Patented Dec. 17, 1940

2,225,448

UNITED STATES PATENT OFFICE 2,225,448

PRESSURE COOKER

Everett R. Hamilton, Eau Claire, Wis., assignor to National Pressure Cooker Company, Eau Claire, Wis., a corporation of Wisconsin Application January 31, 1938, Serial No. 187,926

6 Claims. (Cl. 220—40)

This invention relates to new and useful improvements in pressure cookers of the general character disclosed in Patent No. 2,022,868, granted to Carl Nelson December 3, 1935.

An object of the present invention is to provide a simple fool-proof mechanism for securing the cover of the cooker in sealing engagement with the cooker body, whereby the cover cannot accidentally be blown off the cooker when the cover securing means is operated to release the cover.

A further object is to provide a pressure cooker comprising a body having a plurality of inwardly projecting lugs provided adjacent its upper end or mouth and having an annular seat arranged beneath said lugs adapted to be engaged by the cover, and the cover having lugs adapted to co-operate with the lugs on the cooker body to prevent the cover from being blown off the cooker, when the cover is initially released from its seat and the cooker is under pressure, and means also being provided whereby the cover must be bodily lifted out of engagement with its seat before it can be relatively rotated to permit its complete removal from the cooker body.

A further object is to provide a pressure cooker comprising a cover having means for securing it in sealing engagement with the cooker body, said securing means comprising a plurality of lugs provided respectively, on the cooker body and cover, and a lock ring having means adapted to be moved into interlocking engagement with the lugs on the cooker body, said lugs being so arranged on their respective parts that the cover must be positioned on the cooker body at a predetermined point before it can be rotated to a position to engage the seat, and the lugs on the lock ring and cooker body having faces slightly inclined to the vertical, which inclined faces co-act to force the cover into sealing engagement with the seat, when the lock ring is relatively rotated with respect to the cooker body and cover, and said lock ring having a plurality of clamping screws adapted to engage the cover and force it into seal-tight engagement with its seat, when the cover and lock ring are properly positioned on the cooker body.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the selected embodiment of the invention here shown, there is illustrated for purposes of disclosure, a portion of a pressure cooker comprising a body 2 shown having an enlargement 3 at its upper end, whose wall defines the usual mouth of the cooker body. A plurality of inwardly projecting lugs 4 are provided on the wall 3 of the cooker body. These lugs are spaced equi-distant apart and three lugs are preferably provided, although it is to be understood that the number of lugs used has no particular bearing upon the scope of the invention.

Figure 4:
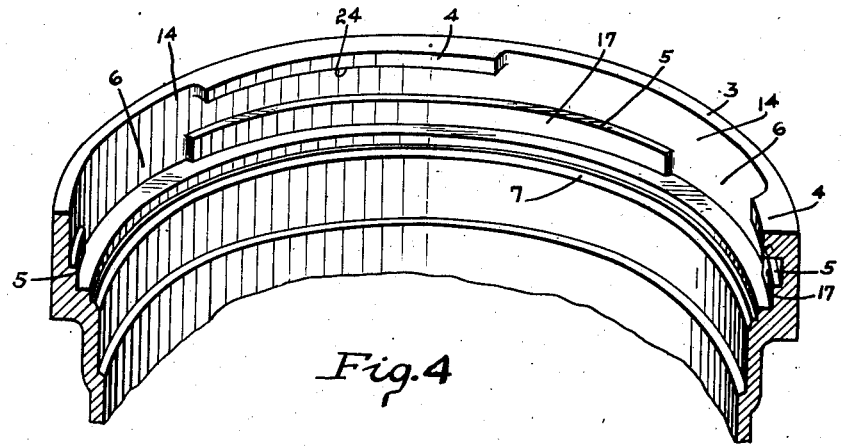
Figure 4 is a detail sectional view in perspective showing the preferred construction of the mouth of the cooker body.

An annular shoulder 5 is provided on the wall portion 3 and is spaced downwardly from the lower faces of the lugs 4, as clearly illustrated in Figure 4. A plurality of recesses 6 are provided in the shoulder 5 for purposes subsequently to be described.

Figure 8:
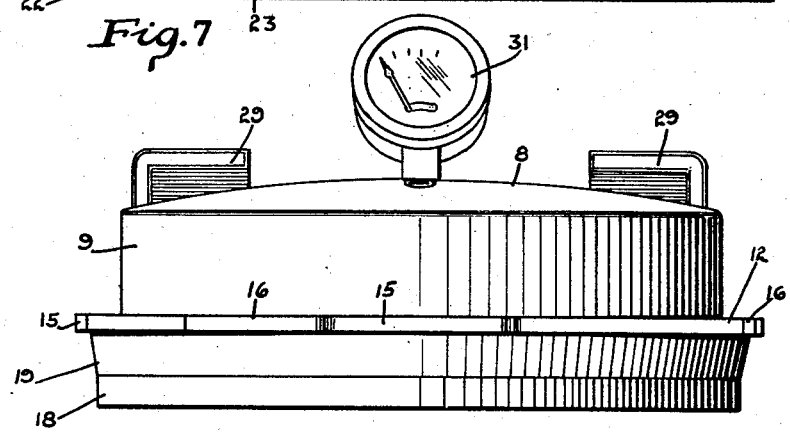
Figure 8 is a view showing the cover removed from the cooker body.

An annular seat 7 is formed in the mouth of the cooker body below the lugs 4 and annular shoulder 5, as best shown in Figure 4. This seat is preferably tapered, as shown, and has a comparatively narrow face, whereby the cover may readily be pressed or forced into sealing engagement therewith. The cover, as best illustrated in Figures 5 and 8, comprises an upper dome-shaped wall 8 and a cylindrical wall 9 adapted to receive a lock ring, generally indicated by the numeral 11.

Figure 3:
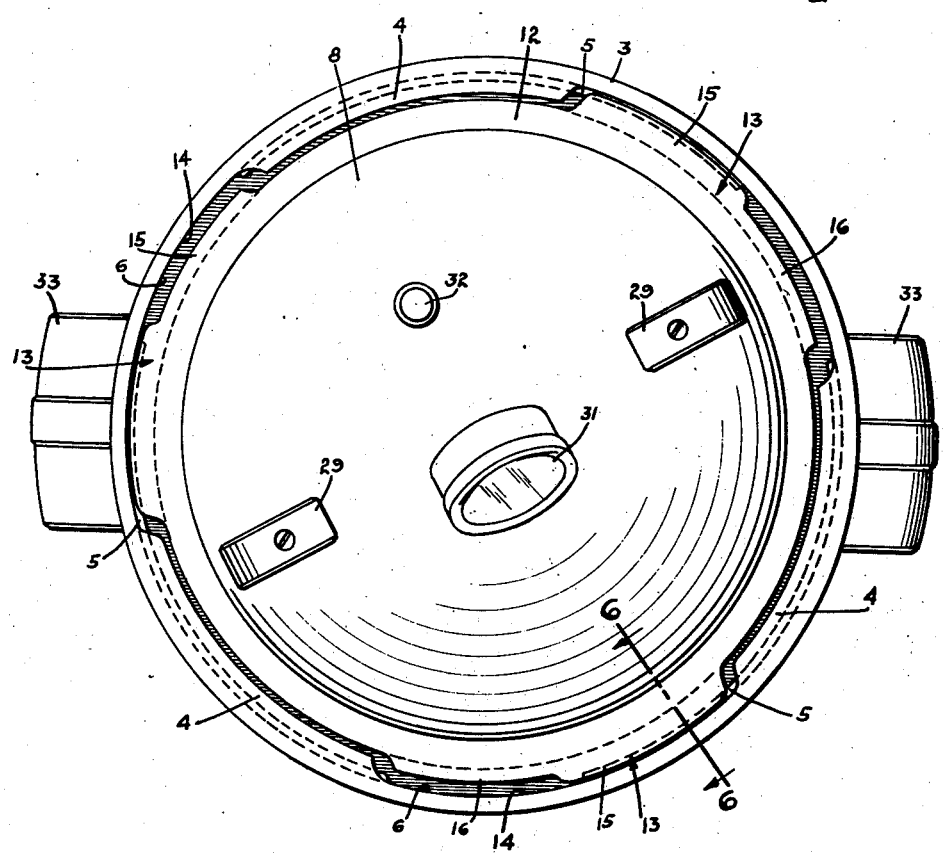
Figure 3 is a view similar to Figure 2, showing the cover positioned whereby it may be conveniently removed from the cooker body.

The cover is shown having an annular horizontal flange 12 provided with a plurality of radial lugs 13 adapted to be received in the spaces 14 between the inwardly projecting lugs 4 of the cooker mouth. The peripheries of the lugs 13 are stepped to provide, in effect, relatively long and short lugs 15 and 16, respectively, as best illustrated in Figure 3. The diameter or radius short or low, of the lugs 16 is slightly less than the diameter of the inner cylindrical face 17 of the shoulder 5, and the diameter of the high or long lugs 15 is slightly less than the inside diameter of the wall 3. It will also be noted, by reference to Figure 3, that the combined over all length of each lug 13, including the lugs 15 and 16, is slightly less than the width of one of the gaps 14, whereby the lugs 13 may readily pass through said gaps, when placing the cover upon the cooker body. The cover, as shown in Figures 5, 6, and 8, also comprises a depending annular flange 18 having an outer tapered face 19 adapted to engage the tapered seat 7 of the cooker mouth.

Figure 6:
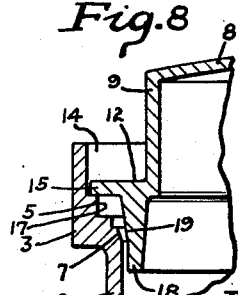
Figure 6 is a detail sectional view on the line 6—6 of Figure 3, showing the cover loosely supported in the mouth of the cooker body and out of engagement with its seat.

When the cover is initially placed upon the cooker body, the lugs 15 will engage the annular shoulder 5 before the tapered face 19 of the cover engages the seat 7, as clearly illustrated in Figure 6. The cover is then rotated in a counter clock-wise direction from the position shown in Figure 3 until the relatively longer lugs 15 drop into the recesses 6, provided in the annular shoulder 5. Before the lugs 15 drop into the recesses 6, the relatively shorter lugs 16 will pass under the inwardly projecting lugs 4 of the cooker mouth, whereby, when the lugs 15 are received in the recesses 6 to permit the flange 18 of the cover to drop into engagement with the seat 7, the relatively shorter or low lugs 16 will be positioned beneath the inwardly projecting lugs 4 of the cooker mouth. When the lugs 16 are so positioned, it will readily be seen, by reference to Figure 2, that the cover cannot be completely removed from the cooker body by lifting it straight upwardly because of the relatively lower lugs 16 engaging the lugs 4 of the cooker body. To completely remove the cover from the cooker body, the cover must be rotated to substantially the position shown in Figure 3.

Figure 5:
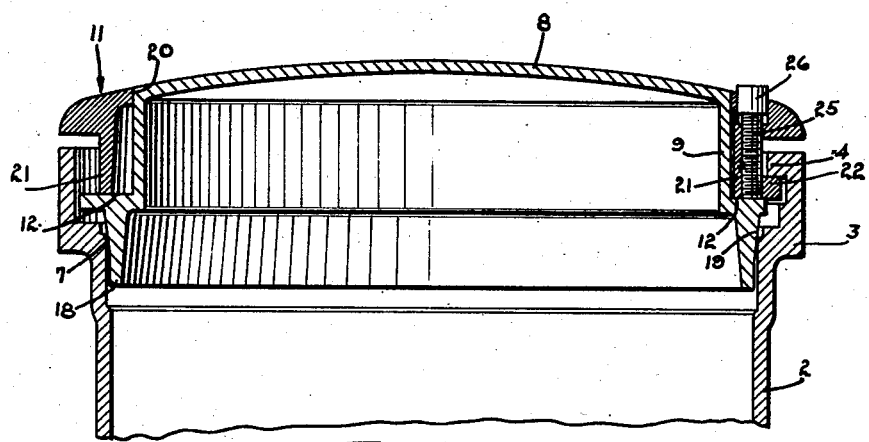
Figure 5 is a detail sectional view on the line 5—5 of Figure 2, showing the clamping screws of the lock ring operated to force the cover into sealing engagement with its seat.
Figure 7:
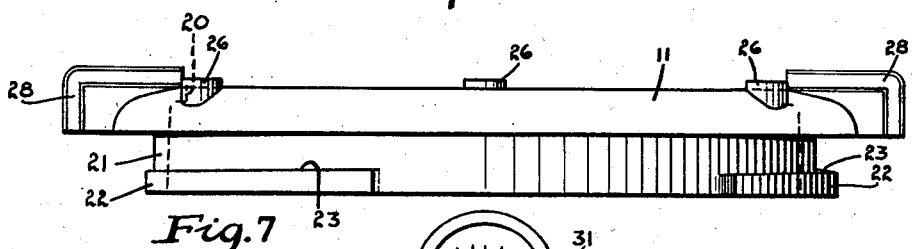
Figure 7 is a view showing the lock ring removed from the cover.

The means provided for securing the cover in leak-tight engagement with the seat 7 is best illustrated in Figure 7, and comprises the lock ring 11 which, as shown in Figures 5 and 7, has an annular depending flange 21 provided with a plurality of radial lugs 22 spaced apart equi-distant around the circumference of the flange 21. The lugs 22 are of such size as to readily pass through the gaps 14 provided between the lugs 4 of the cooker body. The lugs 22 of the lock ring have their upper faces 23 slightly inclined to the vertical and adapted to engage the bottom faces 24 of the lugs 4 of the cooker body, as shown in Figure 5. The lower or bottom edge of the flange 21 of the lock ring is adapted to engage the upper surface of the flange 12 of the cover, as shown at the left hand side of Figure 5. The lock ring is also provided with a bore 20 adapted to receive the cylindrical wall portion 9 of the cover.

A plurality of suitable clamping screws 25 are provided in the lock ring 11, each provided with a head 26 shown having hexagonal sockets 27 therein adapted to receive a suitable instrumentality for rotating or operating the screws 25 to secure the cover to its seat or release it therefrom. The lock ring is also provided with suitable hand grips 28, whereby it may be conveniently rotated to move its lugs 22 into or out of locking engagement with the lugs 4 of the cooker body.

It will also be noted, by reference to Figure 3, that the cover is provided with suitable handles 29, whereby it may be conveniently rotated upon the cooker body in the operation of securing the cover thereto or removing it therefrom. The cover is shown provided with a conventional pressure gauge 31 and a safety relief valve 32, as is common practice in apparatus of this general nature.

The cooker body is also shown provided with suitable handles 33, as illustrated in Figure 3. The handles 28 of the lock ring and 29 of the cover and 33 of the cooker body are preferably constructed of a suitable non-conductive material, such as Bakelite, to minimize the conduction of heat from the cooker body.

The novel apparatus herein disclosed, is very simple and inexpensive in construction, whereby the cooker may be manufactured at small cost. The lugs on the cooker body and cover are so arranged that the cover cannot be moved into engagement with its seat until it has been moved to a predetermined position on the cooker body, whereby the relatively shorter or lower lugs 16 are positioned beneath the lugs 4 of the cooker body.

When so positioned, the cover cannot be lifted vertically out of engagement with its seat to completely remove it from the cooker body. As previously stated, when the cover is initially moved out of engagement with the seat 7, the relatively lower lugs 16 will impinge against the bottom faces of the lugs 4, thereby requiring that the cover be relatively rotated from the position shown in Figure 2 to the position shown in Figure 3, before it can be completely removed from the cooker body.

By so arranging the lugs on the cooker body and cover, should the cover accidentally be released from its seat before releasing the pressure from within the cooker body, it cannot be accidentally blown from the cooker because of the lugs 16 engaging the lugs 4 of the cooker body. When the lock ring is thus released before the pressure in the cooker is released, the pressure within the cooker body may lift the cover off its seat sufficiently to permit the pressure to escape to the atmosphere through the gap provided between the flange 18 of the cover and the seat 7, as will be clearly understood by reference to Figure 6. Thus, the lugs 16 and 4 cooperate to provide a safety device for preventing the cover from accidentally being blown off the cooker body, should it be released before the pressure therein has been exhausted or been released to the atmosphere.

Figure 2:
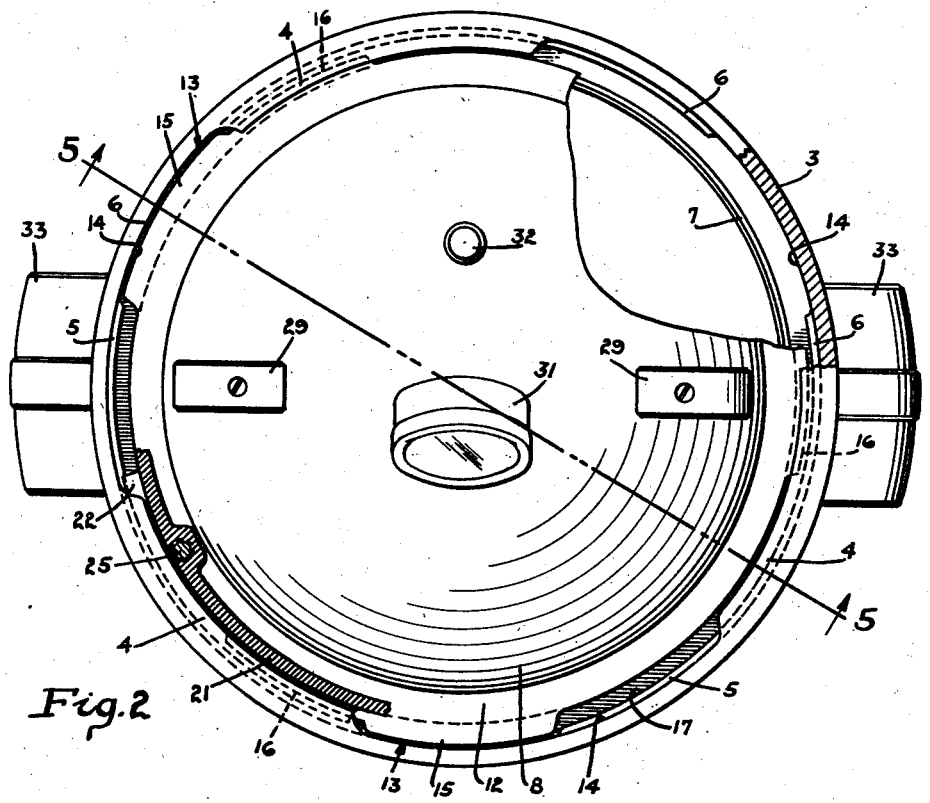
Figure 2 is a similar view on a slightly larger scale, with the lock ring removed, and partially broken away to more clearly show the arrangement of the lugs on the cooker body and cover.
Figure 1:
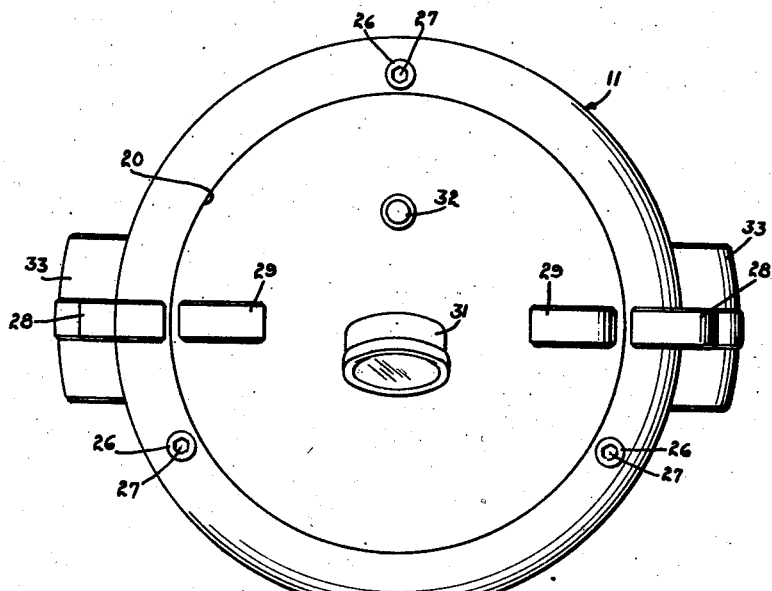
Figure 1 is a top view of my improved pressure cooker.

When the cover has been rotated to the position shown in Figure 2, the lock ring is placed thereon, as shown in Figure 5, and the clamping screws 25 rotated, whereby the lugs 22 of the lock ring will engage the lugs 4 of the cooker body and thus cause the cover to be forced into sealing engagement with the seat 7, when the clamping screws 25 are operated.

In the structure illustrated in the drawings, the lugs 15 and 16 are so arranged that when the cover is rotated in a clockwise direction from the position shown in Figure 3, the relatively longer lugs 15 will drop into the recesses 6 provided in the shoulder 5, thereby preventing further rotation of the cover on the cooker body, and permitting the cover to sealingly engage the seat 7. When the cover is lifted out of engagement with its seat and rotated from the position shown in Figure 2 that shown in Figure 3, or to a position whereby it may readily be lifted completely off the cooker, a suitable stop, not shown in the drawings, is engaged by the cover, thereby to prevent it from over-running the position shown in Figure 3.

I claim as my invention:

1. A pressure cooker comprising a body having a plurality of inwardly projecting lugs adjacent its upper edge, an annular seat on said body spaced downwardly from said lugs, a cover having a portion adapted to sealingly engage said seat, projecting means on the periphery of the cover adapted to be received between the lugs on the cooker body, an annular shoulder on the cooker body between said inwardly projecting lugs and the seat adapted to be engaged by the projecting means on the cover, when the cover is initially placed on the cooker body, thereby to prevent the cover from sealingly engaging the seat, said annular shoulder having recesses therein adapted to receive the projecting means on the cover, when the cover is rotated to a predetermined position on the cooker body, thereby to permit the cover to sealingly engage said seat, means for forcing the cover into sealing engagement with the seat, and the inwardly projecting lugs on the cooker body and the projecting means on the cover cooperating to provide a safety means for preventing the cover from being blown off the cooker body when the cover is initially released from the seat and the cooker is under pressure.

2. A pressure cooker comprising a body having a plurality of inwardly projecting lugs adjacent its upper edge spaced apart circumferentially of said body, an annular seat below said lugs, a cover having a portion adapted to sealingly engage said seat, a plurality of lugs on the periphery of the cover adapted to be received between the lugs on the cooker body, an annular shoulder on the cooker body located at an elevation between the inwardly projecting lugs and the seat thereof adapted to be engaged by the lugs on the cover, when the cover is initially placed on the cooker body, thereby to prevent the cover from sealingly engaging the seat, said annular shoulder having recesses therein adapted to receive the lugs on the cover, when the cover is rotated to a predetermined position on said shoulder, thereby to permit the cover to sealingly engage said seat, means for forcing the cover into sealing engagement with the seat, and the lugs on the cooker body and cover, respectively, cooperating to provide a safety means for preventing the cover from being blown off the cooker body, when the cover is initially released from the seat and the cooker is under pressure.

3. A pressure cooker comprising a body having a plurality of inwardly projecting lugs adjacent its upper edge, an annular seat on said body spaced downwardly from said lugs, a cover having a portion adapted to sealingly engage said seat, a plurality of lugs on the periphery of the cover adapted to be received between the lugs on the cooker body, an annular shoulder on the cooker body located at an elevation between said inwardly projecting lugs and the seat thereof adapted to be engaged by the lugs on the cover, when the cover is initially placed on the cooker body, thereby to prevent the cover from sealingly engaging the seat, said annular shoulder having recesses therein adapted to receive the lugs on the cover, when the cover is rotated to a predetermined position on the cooker body, thereby to permit the cover to sealingly engage said seat, means for forcing the cover into sealing engagement with the seat, and the lugs on the cooker body and cover, respectively cooperating to provide a safety means for preventing the cover from being blown off the cooker body when the cover is initially released from the seat and the cooker is under pressure, said safety means requiring that the cover be relatively rotated upon the cooker body before the cover can be completely removed from the cooker.

4. A pressure cooker comprising a body having a plurality of inwardly projecting lugs adjacent its upper edge, an annular seat on said body spaced downwardly from said lugs, a cover having a depending flange adapted to sealingly engage said seat, a plurality of radial lugs on the cover adapted to be received between the lugs on the cooker body, means on the cooker body between said inwardly projecting lugs and the seat adapted to be engaged by the lugs on the cover, when the cover is initially placed on the cooker body, thereby to prevent the depending flange of the cover from sealingly engaging the seat, means whereby when the cover is rotated to a predetermined position on the cooker body, its flange will sealingly engage said seat, a clamping ring on the cover having means arranged for interlocking engagement with the lugs on the cooker body thereby to secure the cover to the seat, and the lugs on the cooker body and cover cooperating to prevent the cover from being blown from the cooker body, when the clamping ring is initially operated to release the cover from its seat and the cooker is under pressure.

5. A pressure cooker comprising a body having a plurality of inwardly projecting lugs adjacent its upper edge, an annular seat on said body spaced downwardly from said lugs, a cover having a depending flange adapted to sealingly engage said seat, a plurality of radial lugs on the cover each having a stepped periphery, whereby a plurality of high and low lugs are provided, a shoulder on the cooker body between the inwardly projecting lugs and the seat thereof adapted to be engaged by the relatively higher lugs of the cover, when the cover is initially placed on the cooker body, thereby to prevent the cover from sealingly engaging the seat, recesses in said shoulder adapted to receive said higher lugs, when the cover is rotated to a predetermined position on the cooker body, whereby the cover flange may move into sealing engagement with said seat, the relatively lower lugs of the cover being positioned beneath the inwardly projecting lugs on the cooker body, when the cover is engaged with its seat, whereby the cover cannot be removed from the cooker body without relatively rotating it thereon, and a lock ring rotatably mounted on the cover and having a plurality of radial lugs adapted to engage the lugs on the cooker body, thereby to force the cover into leak-tight engagement with said seat.

6. A pressure cooker comprising a body having a plurality of inwardly projecting lugs adjacent its upper edge, an annular seat on said body spaced downwardly from said lugs, a cover having a portion adapted to sealingly engage said seat, a plurality of radial lugs on the cover each having a stepped periphery, whereby a plurality of high and low lugs are provided, a shoulder on the cooker body between the inwardly projecting lugs and the seat thereof adapted to be engaged by the relatively higher lugs of the cover, when the cover is initially placed on the cooker body, thereby to prevent the cover from sealingly engaging the seat, recesses in said shoulder adapted to receive said higher lugs, when the cover is rotated to a predetermined position on the cooker body, whereby when the cover moves into sealing engagement with said seat, the relatively lower lugs thereof are positioned beneath the inwardly projecting lugs on the cooker body, whereby the cover cannot be removed from the cooker body without relatively rotating it thereon, a lock ring rotatably mounted on the cover and having radial lugs adapted to interlock with the lugs on the cooker body, and a plurality of screw elements in the lock ring having means whereby they may be conveniently operated to force the cover into leak-tight engagement with said seat.

EVERETT R. HAMILTON.